US011524493B2

(12) United States Patent
Wilson et al.

(10) Patent No.: US 11,524,493 B2
(45) Date of Patent: Dec. 13, 2022

(54) THERMOFORM WINDSHIELD STACK WITH INTEGRATED FORMABLE MOLD

(71) Applicant: Racing Optics, Inc., Las Vegas, NV (US)

(72) Inventors: Bart E. Wilson, Las Vegas, NV (US); Stephen S. Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 0 days.

(21) Appl. No.: 16/778,928

(22) Filed: Jan. 31, 2020

(65) Prior Publication Data
US 2020/0247102 A1    Aug. 6, 2020

Related U.S. Application Data

(60) Provisional application No. 62/799,880, filed on Feb. 1, 2019.

(51) Int. Cl.
*B32B 27/36*     (2006.01)
*B32B 27/08*     (2006.01)
(Continued)

(52) U.S. Cl.
CPC ............... *B32B 27/36* (2013.01); *B32B 7/12* (2013.01); *B32B 27/08* (2013.01); *B60J 1/02* (2013.01);
(Continued)

(58) Field of Classification Search
CPC .............. B32B 27/36; B32B 2307/584; B32B 2307/412; B32B 2307/41; B32B 2307/306; B32B 27/08; B32B 7/12
See application file for complete search history.

(56) References Cited

U.S. PATENT DOCUMENTS 1,337,036 A    4/1920   Bergmann
1,366,907 A    2/1921   Dunand
(Continued)

FOREIGN PATENT DOCUMENTS

AU    2015277196 A1    1/2017
DE       3637188 A1    5/1988
(Continued)

OTHER PUBLICATIONS

Hostaphan RBB biaxially oriented film data sheet (Year: 2011).*
(Continued)

*Primary Examiner* — Ellen S Hock
(74) *Attorney, Agent, or Firm* — Stetina Brunda Garred and Brucker

(57) ABSTRACT

A method of installing a stack of two or more lenses on a curved substrate includes placing a moldable coveting on a curved substrate, the moldable covering including a stack of two or more lenses, an adhesive layer interposed between each pair of adjacent lenses from among the two or more lenses, and a sacrificial layer disposed on an outermost lens of the stack, the sacrificial layer including a sacrificial lens and a sacrificial adhesive interposed between the sacrificial lens and the outermost lens of the stack. The method may include applying heat and pressure to the sacrificial layer and peeling off the sacrificial layer to reveal the stack of two or more lenses.

10 Claims, 3 Drawing Sheets

(51) Int. Cl.
  *B32B 7/12* (2006.01)
  *B60J 1/02* (2006.01)
(52) U.S. Cl.
  CPC ..... *B32B 2307/306* (2013.01); *B32B 2307/41* (2013.01); *B32B 2307/412* (2013.01); *B32B 2307/584* (2013.01); *B32B 2367/00* (2013.01); *B32B 2605/006* (2013.01)

(56) References Cited

U.S. PATENT DOCUMENTS

| | | |
|---|---|---|
| 2,339,280 A | 1/1944 | Madson |
| 2,354,415 A | 7/1944 | Woodard |
| 2,461,604 A | 2/1949 | Huntsman |
| 2,511,329 A | 6/1950 | Craig |
| 2,546,117 A | 3/1951 | Whelan |
| 2,563,125 A | 8/1951 | Malcom, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,095,575 A | 7/1963 | Radov |
| 3,298,031 A | 1/1967 | Morgan |
| 3,475,766 A | 11/1969 | Raschke |
| 3,785,102 A | 1/1974 | Amos |
| 3,810,815 A | 5/1974 | Welhart et al. |
| 3,937,863 A | 2/1976 | Moore |
| 3,948,662 A | 4/1976 | Alston et al. |
| 3,950,580 A | 4/1976 | Boudet |
| 3,987,569 A | 10/1976 | Chase |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,332,861 A | 6/1982 | Franz et al. |
| 4,380,563 A | 4/1983 | Ayotte |
| 4,528,701 A | 7/1985 | Smith |
| 4,582,764 A | 4/1986 | Allerd et al. |
| 4,658,515 A | 4/1987 | Oatman |
| 4,696,860 A | 9/1987 | Epperson |
| 4,716,601 A | 1/1988 | McNeal |
| 4,729,179 A | 3/1988 | Quist |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,864,653 A | 9/1989 | Landis |
| 4,867,178 A | 9/1989 | Smith |
| 4,884,296 A | 12/1989 | Nix, Jr. |
| 4,889,754 A | 12/1989 | Vargas |
| D306,363 S | 2/1990 | Stackhouse et al. |
| 4,907,090 A | 3/1990 | Ananian |
| D307,065 S | 4/1990 | Friedman |
| 4,920,576 A | 5/1990 | Landis |
| 4,934,792 A | 6/1990 | Tovi |
| 4,964,171 A | 10/1990 | Landis |
| 4,965,887 A | 10/1990 | Paoluccio et al. |
| 4,973,511 A | 11/1990 | Farmer et al. |
| 5,000,528 A | 3/1991 | Kawakatsu |
| 5,002,326 A | 3/1991 | Westfield et al. |
| D318,147 S | 7/1991 | Russell |
| D319,449 S | 8/1991 | Millar |
| D321,268 S | 10/1991 | Nix, Jr. |
| 5,067,475 A | 11/1991 | Posnansky |
| 5,071,206 A | 12/1991 | Hood et al. |
| H1023 H | 3/1992 | Wiseman, Sr. |
| 5,104,929 A | 4/1992 | Bilkadi |
| 5,113,528 A | 5/1992 | Burke et al. |
| D331,820 S | 12/1992 | Scanlon |
| 5,183,700 A | 2/1993 | Austin |
| 5,194,293 A | 3/1993 | Foster |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| D349,362 S | 8/1994 | Russell |
| 5,364,671 A | 11/1994 | Gustafson |
| D353,691 S | 12/1994 | Scanlon |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,471,036 A | 11/1995 | Sperbeck |
| 5,486,883 A | 1/1996 | Candido |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |
| 5,633,049 A | 5/1997 | Bilkadi et al. |
| 5,668,612 A | 9/1997 | Hung |
| 5,671,483 A | 9/1997 | Reuber |
| 5,694,650 A | 12/1997 | Hong |
| 5,709,825 A | 1/1998 | Shih |
| 5,740,560 A | 4/1998 | Muoio |
| 5,792,535 A | 8/1998 | Weder |
| 5,846,659 A | 12/1998 | Hartmut et al. |
| D404,849 S | 1/1999 | Desy |
| 5,896,991 A | 4/1999 | Hippely et al. |
| 5,937,596 A | 8/1999 | Leeuwenburgh et al. |
| 5,956,175 A | 9/1999 | Hojnowski |
| 5,972,453 A | 10/1999 | Akiwa et al. |
| 5,991,072 A | 11/1999 | Solyntjes et al. |
| 5,991,081 A | 11/1999 | Haaland et al. |
| D418,256 S | 12/1999 | Caruana |
| 6,008,299 A | 12/1999 | McGrath et al. |
| 6,049,419 A | 4/2000 | Wheatley et al. |
| 6,085,358 A | 7/2000 | Cogan |
| 6,217,099 B1 | 4/2001 | McKinney et al. |
| 6,250,765 B1 | 6/2001 | Murakami |
| 6,305,073 B1 | 10/2001 | Badders |
| 6,375,865 B1 | 4/2002 | Paulson et al. |
| 6,388,813 B1 | 5/2002 | Wilson et al. |
| 6,416,872 B1 | 7/2002 | Maschwitz |
| 6,432,522 B1 | 8/2002 | Friedman et al. |
| 6,461,709 B1 | 10/2002 | Janssen et al. |
| 6,469,752 B1 | 10/2002 | Ishikawa et al. |
| 6,506,496 B1 | 1/2003 | Frugier et al. |
| 6,536,045 B1 | 3/2003 | Wilson et al. |
| 6,536,589 B2 | 3/2003 | Chang |
| 6,555,235 B1 | 4/2003 | Aufderheide et al. |
| 6,559,902 B1 | 5/2003 | Kusuda et al. |
| 6,576,349 B2 | 6/2003 | Lingle et al. |
| 6,592,950 B1 | 7/2003 | Toshima et al. |
| 6,614,423 B1 | 9/2003 | Wong et al. |
| D480,838 S | 10/2003 | Martin |
| 6,654,071 B2 | 11/2003 | Chen |
| 6,660,389 B2 | 12/2003 | Liu et al. |
| 6,667,738 B2 | 12/2003 | Murphy |
| 6,750,922 B1 | 6/2004 | Benning |
| 6,773,778 B2 | 8/2004 | Onozawa et al. |
| 6,777,055 B2 | 8/2004 | Janssen et al. |
| 6,800,378 B2 | 10/2004 | Hawa et al. |
| 6,811,857 B1 | 11/2004 | Bravet et al. |
| 6,838,610 B2 | 1/2005 | de Moraes |
| 6,841,190 B2 | 1/2005 | Liu et al. |

(56) References Cited

U.S. PATENT DOCUMENTS

| | | |
|---|---|---|
| 6,847,492 B2 | 1/2005 | Wilson et al. |
| 6,864,882 B2 | 3/2005 | Newton |
| 6,870,686 B2 | 3/2005 | Wilson et al. |
| 6,879,319 B2 | 4/2005 | Cok |
| 6,907,617 B2 | 6/2005 | Johnson |
| 6,911,593 B2 | 6/2005 | Mazumder et al. |
| 6,952,950 B2 | 10/2005 | Doe et al. |
| 6,967,044 B1 | 11/2005 | O'Brien |
| D512,797 S | 12/2005 | Canavan et al. |
| 6,995,976 B2 | 2/2006 | Richardson |
| 7,070,837 B2 | 7/2006 | Ross |
| 7,071,927 B2 | 7/2006 | Blanchard |
| 7,101,810 B2 | 9/2006 | Bond et al. |
| 7,143,979 B2 | 12/2006 | Wood et al. |
| 7,184,217 B2 | 2/2007 | Wilson et al. |
| 7,215,473 B2 | 5/2007 | Fleming |
| 7,226,176 B1 | 6/2007 | Huang |
| 7,238,401 B1 | 7/2007 | Dietz |
| 7,311,956 B2 | 12/2007 | Pitzen |
| D559,442 S | 1/2008 | Regelbrugge et al. |
| 7,351,470 B2 | 4/2008 | Draheim et al. |
| D569,557 S | 5/2008 | Cho |
| 7,410,684 B2 | 8/2008 | McCormick |
| 7,425,369 B2 | 9/2008 | Oakey |
| 7,495,895 B2 | 2/2009 | Carnevali |
| 7,629,052 B2 | 12/2009 | Brumwell |
| 7,663,047 B2 | 2/2010 | Hanuschak |
| 7,709,095 B2 | 5/2010 | Persoone et al. |
| 7,727,615 B2 | 6/2010 | Kato et al. |
| 7,752,682 B2 | 7/2010 | VanDerWoude et al. |
| 7,858,001 B2 | 12/2010 | Qin et al. |
| 7,957,524 B2 | 6/2011 | Chipping |
| 8,011,137 B2 | 9/2011 | Durfield et al. |
| 8,044,942 B1 | 10/2011 | Leonhard et al. |
| 8,261,375 B1 | 9/2012 | Reaux |
| 8,294,843 B2 | 10/2012 | Hollaway |
| 8,361,260 B2 | 1/2013 | Wilson et al. |
| 8,455,105 B2 | 6/2013 | Hobeika et al. |
| 8,487,277 B2 | 7/2013 | Labrot et al. |
| 8,519,362 B2 | 8/2013 | Labrot et al. |
| D692,187 S | 10/2013 | Isobe |
| D692,189 S | 10/2013 | Isobe |
| 8,567,596 B1 | 10/2013 | Mason, Jr. |
| 8,693,102 B2 | 4/2014 | Wilson et al. |
| 8,734,953 B2 | 5/2014 | Sablayrolles et al. |
| 8,859,080 B2 | 10/2014 | Thellier et al. |
| 8,889,801 B2 | 11/2014 | Liao et al. |
| 8,974,620 B2 | 3/2015 | Wilson et al. |
| D726,378 S | 4/2015 | Wako |
| 8,999,509 B2 | 4/2015 | Port et al. |
| 9,104,256 B2 | 8/2015 | Wilson et al. |
| 9,128,545 B2 | 9/2015 | Wilson et al. |
| 9,150,763 B2 | 10/2015 | Lopez et al. |
| 9,274,625 B2 | 3/2016 | Wilson et al. |
| 9,295,297 B2 | 3/2016 | Wilson |
| 9,442,306 B1 | 9/2016 | Hines et al. |
| 9,471,163 B2 | 10/2016 | Wilson et al. |
| 9,477,022 B2 | 10/2016 | Laluet et al. |
| 9,526,290 B2 | 12/2016 | Wilson |
| D781,507 S | 3/2017 | Huh |
| D781,508 S | 3/2017 | Huh |
| 9,726,940 B2 | 8/2017 | Tomiyasu |
| D805,256 S | 12/2017 | Yang |
| 9,846,265 B2 | 12/2017 | Ehrensperger et al. |
| 9,905,297 B2 | 2/2018 | Best |
| D815,190 S | 4/2018 | Dellemann |
| 9,968,155 B2 | 5/2018 | Wilson |
| 10,070,678 B2 | 9/2018 | Wilson |
| 10,226,095 B2 | 3/2019 | Wilson |
| 10,227,501 B2 | 3/2019 | Hwang et al. |
| D849,240 S | 5/2019 | Guo et al. |
| 10,300,680 B2 | 5/2019 | Laluet |
| 10,321,731 B2 | 6/2019 | Wilson |
| 10,345,934 B2 | 7/2019 | Wilson et al. |
| D879,384 S | 3/2020 | Sato |
| D882,182 S | 4/2020 | Fekete |
| 10,620,670 B2 | 4/2020 | Wilson et al. |
| 10,625,663 B2 | 4/2020 | Laluet |
| 10,688,757 B2 | 6/2020 | Laluet et al. |
| 10,716,172 B2 | 7/2020 | Weissenberger et al. |
| 10,739,669 B2 | 8/2020 | Schiavoni et al. |
| 10,831,092 B2 | 11/2020 | Schiavoni et al. |
| 11,027,528 B2 | 6/2021 | Laluet et al. |
| 2001/0035936 A1 | 11/2001 | Maisnik |
| 2002/0025441 A1 | 2/2002 | Hieda et al. |
| 2002/0101411 A1 | 8/2002 | Chang |
| 2002/0109922 A1 | 8/2002 | Wilson et al. |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0188821 A1 | 9/2005 | Yamashita et al. |
| 2005/0200154 A1 | 9/2005 | Barbee et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0057399 A1 | 3/2006 | Persoone et al. |
| 2006/0114245 A1 | 6/2006 | Masters et al. |
| 2006/0177654 A1 | 8/2006 | Shoshi |
| 2006/0204776 A1 | 9/2006 | Chen et al. |
| 2006/0254088 A1 | 11/2006 | McCormick |
| 2006/0285218 A1 | 12/2006 | Wilson et al. |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo de Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0231979 A1 | 9/2008 | Chen |
| 2008/0286500 A1 | 11/2008 | Sussner et al. |
| 2008/0292820 A1 | 11/2008 | Padiyath et al. |
| 2009/0011205 A1 | 1/2009 | Thiel |
| 2009/0026095 A1 | 1/2009 | Lofland et al. |
| 2009/0086415 A1 | 4/2009 | Chipping |
| 2009/0087655 A1 | 4/2009 | Kamada et al. |
| 2009/0105437 A1 | 4/2009 | Determan et al. |
| 2009/0181242 A1 | 7/2009 | Enniss et al. |
| 2009/0233032 A1 | 9/2009 | Craig |
| 2010/0026646 A1 | 2/2010 | Xiao et al. |
| 2010/0033442 A1 | 2/2010 | Kusuda et al. |
| 2010/0102197 A1 | 4/2010 | McIntyre |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0073773 A1 | 3/2011 | Labrot et al. |
| 2011/0119801 A1 | 5/2011 | Wright |
| 2011/0165361 A1 | 7/2011 | Sherman et al. |

(56) References Cited

U.S. PATENT DOCUMENTS

| | | | |
|---|---|---|---|
| 2011/0267793 | A1 | 11/2011 | Cohen et al. |
| 2011/0279383 | A1 | 11/2011 | Wilson et al. |
| 2012/0003431 | A1 | 1/2012 | Huang |
| 2012/0068083 | A1 | 3/2012 | Labrot et al. |
| 2012/0070603 | A1 | 3/2012 | Hsu |
| 2012/0081792 | A1 | 4/2012 | Neuffer |
| 2012/0183712 | A1 | 7/2012 | Leonhard et al. |
| 2012/0188743 | A1 | 7/2012 | Wilson et al. |
| 2013/0004719 | A1 | 1/2013 | Thellier et al. |
| 2013/0045371 | A1 | 2/2013 | O'Donnell |
| 2013/0089688 | A1 | 4/2013 | Wilson et al. |
| 2013/0252001 | A1 | 9/2013 | Sablayrolles et al. |
| 2013/0293959 | A1 | 11/2013 | McDonald |
| 2014/0220283 | A1 | 8/2014 | Wilson et al. |
| 2014/0259321 | A1 | 9/2014 | Arnold |
| 2015/0033431 | A1 | 2/2015 | Hofer Kraner et al. |
| 2015/0138627 | A1 | 5/2015 | Ehrensperger et al. |
| 2015/0192707 | A1 | 7/2015 | Ehrensperger et al. |
| 2015/0234209 | A1 | 8/2015 | Miyamoto et al. |
| 2015/0294656 | A1 | 10/2015 | Hanuschak |
| 2015/0309609 | A1 | 10/2015 | Wilson et al. |
| 2016/0011414 | A1 | 1/2016 | Joseph |
| 2016/0023442 | A1 | 1/2016 | Faris |
| 2016/0231834 | A1 | 8/2016 | Hardi |
| 2016/0271922 | A1 | 9/2016 | Uzawa et al. |
| 2017/0173923 | A1 | 6/2017 | Davis et al. |
| 2017/0281414 | A1 | 10/2017 | Wilson |
| 2017/0305245 | A1 | 10/2017 | Lux et al. |
| 2018/0094164 | A1 | 4/2018 | Ito et al. |
| 2018/0236753 | A1 | 8/2018 | Wykoff, II et al. |
| 2018/0242403 | A1 | 8/2018 | Weissenberger et al. |
| 2018/0370195 | A1 | 12/2018 | Laluet et al. |
| 2019/0001629 | A1 | 1/2019 | Laluet |
| 2019/0001870 | A1 | 1/2019 | Laluet |
| 2020/0012180 | A1 | 1/2020 | Schiavoni et al. |
| 2020/0276792 | A1 | 9/2020 | Laluet et al. |
| 2020/0370727 | A1 | 11/2020 | Berard et al. |
| 2020/0384740 | A1 | 12/2020 | Berard et al. |
| 2022/0024186 | A1 | 1/2022 | Tondu et al. |

FOREIGN PATENT DOCUMENTS

| | | | |
|---|---|---|---|
| DE | 19808535 | A1 | 9/1999 |
| EP | 192075 | A2 | 8/1986 |
| EP | 671258 | A2 | 9/1995 |
| EP | 1471415 | A2 | 10/2004 |
| EP | 3157480 | A1 | 4/2017 |
| GB | 2310862 | A | 9/1997 |
| JP | 2015128896 | A | 1/1986 |
| JP | 62053832 | A | 3/1987 |
| JP | 2002328613 | A | 11/2002 |
| JP | 2014032222 | A | 2/2014 |
| JP | 2015128896 | A | 7/2015 |
| KR | 20120001292 | A | 1/2012 |
| TW | 200700793 | A | 1/2007 |
| TW | 201027992 | A | 7/2010 |
| WO | 0024576 | A1 | 5/2000 |
| WO | 03052678 | A1 | 6/2003 |
| WO | 2015009114 | A1 | 1/2015 |
| WO | 2015091425 | A1 | 6/2015 |
| WO | 2015195814 | A1 | 12/2015 |

OTHER PUBLICATIONS

Settlement and License Agreement, Dec. 21, 2007, 28 pgs.
www.wikipedia.org, Refractive Index, Oct. 31, 2014.
Whitney, Frank D., Consent Judgment Order, Jan. 3, 2008, 5 pgs.
Prosecution History of U.S. Re-Examination Application No. 95/002,073 titled Touch Screen Protector; pp. 1-1,980.
www.store.moshimode.com; "iVisor AG for iPad 2 Black"; 2004-2010.
Defendant's Motion for Summary Judgment; Oct. 25, 2013; pp. 1-31.
Jake Gaecke; "Appletell Reviews the iVisor for iPad"; www.appletell.com; Sep. 15, 2010 at 12:32 p.m. www.technologytell.com/apple/60407/appletell-reviews-ag-for-ipad/; 2 pages.
www.nushield.com/technology.php; "What Makes NuShield Screen Protectors Superior", 2 pages.
www.spigen.com; "Something You Want"; 2 pages.
www.zagg.com; "Apple iPad 2 (Wi-Fi 3G) Screen Protector"; 2 pages.
www.gadgetguard.com; "Invisible Gadget Guard, the Original"; 1 page.
www.incipotech.com; "Protect Your iPhone 4 with Screen Protectors from Incipo"; 3 pages.
www.store.moshimonde.com; "iVisor AG iPad Screen Protector"; Jul. 2010; 7 pages.
www.store.moshimonde.com; "iVisor XT Crystal Clear Protector for iPad"; Aug. 2010; 3 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
Dictionary.com (http://dictionary.reference.com) 2012.
*Racing Optics, Inc.* v. *Aevoe, Inc., d/b/a/ Moshi*; Case No. 15-cv-017744-JCM-VCF; Aevoe's Initial Disclosure Non-lnfringement, Invalidity and Unenforceability Contentions (Redacted) dated Jan. 7, 2016.
Defendant Aevoe Corp.'s Non-lnfringement Contentions and Responses to Racing Optic's Disclosure of Asserted Claims and Infringement Contentions (U.S. Pat. No. 9,128,545) dated Jan. 7, 2016.
Defendant Aevoe Corp.'s Non-lnfringement Contentions and Responses to Racing Optic's Disclosure of Asserted Claims and Infringement Contentions (U.S. Pat. No. 9,104,256) dated Jan. 7, 2016.
Defendant Aevoe Corp.'s Non-lnfringement Contentions and Responses to Racing Optic's Disclosure of Asserted Claims and Infringement Contentions (U.S. Pat. No. 8,974,620) dated Jan. 7, 2016.
*I-Blason LLC* v. *Aevoe, Inc. and Aevoe Corp.*; Case IPR2016-TBA; Petition for Inter Partes Review of U.S. Pat. No. 8,044,942 (including Exhibits 1001-1019).
Dupont Teijin Films, "Mylar Polyester Film—Optical Properties", Jun. 2003, 2 pages.
https://en.wikipedia.org/wiki/Black_body, "Black Body", Jul. 2009, 11 pages.
https://en.wikipedia.org/wiki/Infrared, "Infrared", Jul. 2009, 12 pages.
https://en.wikipedia.org/wiki/BoPET, "PET Film (biaxially oriented)", Jul. 2009, 4 pages.
Instashield LLC, Bionic Wrench® Inventor Creates Low-Cost Face Shield For Masses, Apr. 15, 2020, 3 pages.
Tom Zillich, Surrey manufacturer hopes to hit home run with face shield that clips to baseball cap, Apr. 29, 2020, 3 pages.
Opentip, Opromo Safety Face Shield Visor for Adult Kids,Protective Cotton Hat with Removable PVC Face Cover <https://www.opentip.com/product.php?products_id=11699030>, May 5, 2020, 3 pages.
Hefute, Hefute 5 PCS Protective Face Cover with Shield Comfortable Full Protection Face Compatiable with Glasses Anti-Droplet Anti-Pollution and Windproof Transparent Safety Face Cover with Shield(Style B) <https://www.amazon.com/dp/B086GSG8DH/ref-sspa_dk_detail_9?psc=1&pd_rd_i=B086GSG8DH&pd_rd_w=Ocdm2&pf_rd_p=48d372c1-f7e1-4b8b-9d02-4bd86f5158c5&pd_rd_wg=qkB2b&pf_rd_r=M%E2%80%A6>, May 6, 2020, 7 pages.
Geanbaye, Geanbaye Safety Full Face Shield Cap Detachable Baseball Cap Anti-Saliva Anti-Spitting Eye Protective Hat Windproof Dustproof <https://www.amazon.com/dp/B086DV32B8/ref=sspa_dk_detail_8?psc=1&pd_rd_i=B086DV32B8&pd_rd_w=MwjfT&pf_rd_p=48d372c1-f7e1-4b8b-9d02-4bd86f5158c5&pd_rd_wg=pxuOs&pf_rd_r=PNDA%E2%80%A6>, May 5, 2020, 8 pages.
Leigh Buchanan, These 2 Companies Are Making Face Shields for Everyone <https://www.inc.com/leigh-buchanan/face-shields-coronavirus-protection-open-source.html>, May 6, 2020, 8 pages.
Brim Shield, photographs, Apr. 21, 2020, 1 pages.

(56) References Cited

OTHER PUBLICATIONS

Hatshield, Shield Yourself With The Hatshield <https7/www.hatshield.com/?gclid=CjwKCAjwp-X0BRAFEiwAheRui1u89v_3URuiwEVvBRGa9TaEfWoZVMJXRkWsZgPTUw-0fHJ5HD-8uhoCc84QAvD_BwE>, Jan. 17, 2020, 11 pages.
Eli N. Perencevich, Moving Personal Protective Equipment Into the Community Face Shields and Containment of COVID-19, Apr. 29, 2020, 2 pages.
Chang, Tian-Ci; Cao, Xun; Bao, Shan-Hu; Ji, Shi-Dong; Luo, Hong-Jie; Jin, Ping; Review of Thermochromic Vanadium Dioxide Based Smart Coatings: From Lab to Commercial Application; Dec. 16, 2017.
Saudi Basic Industries Corporation (SABIC); "The Department of Transportation [DOT] Guidebook" Oct. 2016.
Hostaphan RBB, "Transparent, Temperature Stable Polyester Film for Cooking & Roasting Bags" Jul. 2016.
Hostaphan Win, "White, Long-Term Stable, Thermally Stable Polyester Film for PV Back Sheet Laminates"; Jul. 2016.
PCT Search Report & Written Opinion for PCT/US2019/054565 (dated Dec. 20, 2019).
PCT Search Report & Written Opinion for PCT/US2015/036248 (dated Sep. 16, 2015).
"Declaration of Jerome Aho"; Filed Aug. 3, 2007; Case 3:07-cv-00221-FDW-DCK; Includes: Exhibit A, Nascar Postcard (1 page), Exhibit B, 50th Anniversary Nascar letter sent Jan. 7, 1998 (1 page), and Exhibit C, Front page of "The Official Nascar Preview and Press Guide" (1 page); 9 pages.
*Racing Optics, Inc.* v. *David Leon O'Neal, Edward M. Wallace and Clear View Racing Optics, LLC*; Case 3:07 CV 221 Includes: Exhibit A, Wilson et al. U.S. Pat. No. 6,847,492; and Exhibit B, Wilson et al. U.S. Pat. No. 7,184,217; 34 pages.
International Search Report; International Application No. PCT/US99/95128; Date of Completion: Jan. 18, 2000; 54 pages.
International Search Report; International Application No. PCT/US02/10971; Date of Completion: Nov. 20, 2002; 3 pages.
International Search Report; International Application No. PCT/US03/16284; Date of Completion: Mar. 9, 2004; 3 pages.
European Search Report for Application No. 15809930.9-107 / 3157480 (dated Dec. 15, 2017).
Canadian Office Action for Application Serial No. 2,952,436 (dated Nov. 15, 2019).
Canadian Office Action for Application Serial No. 2,952,436 (dated May 3, 2019).
Australian Examination Report for Application Serial No. 2015277196 (dated Oct. 18, 2018).
*Racing Optics, Inc.* v. *Aevoe Corp. DBA Moshi*; Case 2:15-cv-01774-RCJ-VCF; "Answer to Aevoe's Counterclaims—Jury Trial Demanded"; Nov. 2, 2015; 15 pages.
Gregory Brower et al.; "Complaint for Patent Infringement"; Sep. 15, 2015; 15 pages.
Jeffrey A. Silverstri et al.; "Answer to Complaint for Patent Infringement"; Oct. 7, 2015; 34 pages.
United States Patent and Trademark Office; Office Action for U.S. Appl. No. 15/090,681; dated Aug. 26, 2016; 8 pages.
List of References for U.S. Appl. No. 15/090,681; Receipt date Jun. 30, 2016; 3 pages.
List of References for U.S. Appl. No. 15/090,681; Receipt date Apr. 27, 2016; 4 pages.
Examiner's search strategy and results for U.S. Appl. No. 15/090,681; dated Aug. 21, 2016; 2 pages.
*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition tor Inter Partes Review); Jun. 21, 2016.
*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition tor Inter Partes Review); Jun. 21, 2016.

*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition tor Inter Partes Review); Jun. 21, 2016.
Exhibit 1—Invalidity Contentions re: '545 Patent Under LPR 1-8(b)-(d); at least as early as Jul. 1, 2016.
Exhibit 2—Invalidity Contentions re: '256 Patent Under LPR 1-8(b)-(d); at least as early as Jul. 1, 2016.
Exhibit 3—Invalidity Contentions re: '620 Patent Under LPR 1-8(b)-(d); at least as early as Jul. 1, 2016.
Exhibit 4—Invalidity Contentions re: '625 Patent Under LPR 1-8(b)-(d); at least as early as Jul. 1, 2016.
Exhibit 1002—U.S. Pat. No. 5,364,671 to Gustafson; Case IPR2016-01745; Inter Partes Review of U.S. Pat. No. 8,974,620; at east as early as Sep. 7, 2016; pp. 1-6.
Exhibit 1004—U.S. Pat. No. 7,351,470 to Draheim et al.; Case IPR2016-01745; Inter Partes Review of U.S. Pat. No. 8,974,620 at least as early as Sep. 7, 2016; pp. 1-15.
Exhibit 1001—U.S. Pat. No. 8,974,620 to Wilson et al.; Case IPR2016-01745; Inter Partes Review of U.S. Pat. No. 8,974,620 at least as early as Sep. 7, 2016; pp. 1-15.
Exhibit 1003—U.S. Pat. No. 6,250,765 to Murakami; Case IPR2016-01745; Inter Partes Review of U.S. Pat. No. 8,974,620; at east as early as Sep. 7, 2016; p. 1-8.
Exhibit 1005—U.S. Pat. No. 7,957,524 to Chipping; Case IPR2016-01745; Inter Partes Review of U.S. Pat. No. 8,974,620; at east as early as Sep. 7, 2017; pp. 1-20.
Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.
Exhibit 1006—Japanese Application No. JP 2002-328613 to Kitaguchi Translation; IPR2016-01745; at least as early as Sep. 7, 2016; pp. 1-10.
Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
*Aevoe Corp.* v. *Racing Optics, Inc.*; Declaration of Darran Cairns; Case IPR2016-01745; Inter Partes Review of U.S. Pat. No. 8,974,620; at least as early as Sep. 7, 2016; pp. 1-32.
*Aevoe Corp.* v. *Racing Optics, Inc.*; Petitioner's Power of Attorney; Case IPR2016-01745; Inter Partes Review of U.S. Pat. No. 8,974,620; at least as early as Sep. 7, 2016; pp. 1-3.
Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.
Exhibit 1008—U.S. Appl. No. 13/838,311; Response and Request for Continued Examination; Case IPR2016-01745 Inter Partes Review of U.S. Pat. No. 8,974,620; at least as early as Sep. 7, 2016; pp. 1-21.
*Aevoe Corp.* v. *Racing Optics, Inc.*; Mandatory Notices; Case IPR2016-01745; Inter Partes Review of U.S. Pat. No. 8,974,620; at least as early as Sep. 7, 2016; pp. 1-4.
*Aevoe Corp.* v. *Racing Optics, Inc.*;Power of Attorney; Case IPR2016-01745; Inter Partes Review of U.S. Pat. No. 8,974,620; at least as early as Sep. 7, 2016; pp. 1-4.
*Aevoe Corpv.* *Racing Optics, Inc.*; Notice of Filing Date; Case IPR2016-01745; Inter Partes Review of U.S. Pat. No. 8,974,620; at least as early as Sep. 6, 2016; p. 1-5.
*Aevoe Corp* v. *Racing Optics, Inc.*; Decision; Case IPR2016-01164; Inter Partes Review of U.S. Pat. No. 9,104,256; at east as early as Nov. 7, 2016; p. 1-24.
*Aevoe Corp* v. *Racing Optics, Inc.*; Decision; Case IPR2016-01166; Inter Partes Review of U.S. Pat. No. 9,274,625; at east as early as Nov. 7, 2016; p. 1-23.
*Aevoe Corp* v. *Racing Optics, Inc.*; Decision; Case IPR2016-01165; Inter Partes Review of U.S. Pat. No. 9,128,545; at east as early as Nov. 7, 2016; p. 1-25.

(56) References Cited

OTHER PUBLICATIONS

United States Patent and Trademark Office; Office Action dated Dec. 21, 2016 pertaining to U.S. Appl. No. 15/090,681, filed Apr. 5, 2016; 8 pages.
PCT Search Report and Written Opinion for US2020/016245 (dated Apr. 28, 2020).
Professional Plastics (http://www.professionalplastics.com/MelinexPETFilmDupont) 2012.
Whitney, Frank D., Preliminary Injunction, Aug. 21, 2007, 5 pgs.
Higgins, John P., Answer and Counterclaims to First Amended Complaint, Sep. 4, 2007, 27 pgs.
Ballato, John, Expert Report of John Ballato, Ph.D., Nov. 12, 2007, 5 pgs.
Russell, Geoffrey A., Rebuttal Report of Geoffrey A. Russell, Ph.D., on issues raised in the Export Report of John Ballato, Ph D., Nov. 21, 2007, 15 pgs.
Higgins, John P., Defendants' Second Supplement to Its Response to Plaintiffs' First Set of Interrogatories, Dec. 7, 2007, 25 pgs.
Barnhardt, John J. III, Redacted Version Defendants' Memorandum in Support of Motion for Partial Summary Judgment, Dec. 3, 2007, 36 pgs.
Higgins, John P., Defendants' Second Supplement to its Response to Plaintiffs' First Set of Interrogatories, Dec. 7, 2007, 26 pgs.
Ballato, John, Supplemental Expert Report of John Ballato, Ph D., Nov. 19, 2007, 10 pgs.
Moore, Steven D., Plaintiffs' Motion to Strike Defendants' New and Untimely Invalidity Theory, Dec. 19, 2007, 3 pgs.
Moore, Steven D., Plaintiffs' Brief in Support of Motion to Strike Defendants' New and Untimely Invalidity Theory, Dec. 19, 2007, 10 pgs.
Barnhardt, John J. IIII, Notice Pursuant to 35 U.S.C. 282, Dec. 18, 2007, 3 pgs.

\* cited by examiner

THERMOFORM WINDSHIELD STACK WITH INTEGRATED FORMABLE MOLD

CROSS-REFERENCE TO RELATED APPLICATIONS

This application relates to and claims the benefit of U.S. Provisional Application No. 62/799,880, filed Feb. 1, 2019 and entitled "Thermoform Windshield Stack With Integrated Formable Mold," the entire contents of which is expressly incorporated herein by reference.

STATEMENT RE: FEDERALLY SPONSORED RESEARCH/DEVELOPMENT

Not Applicable

BACKGROUND

1. Technical Field

The present disclosure relates generally to transparent coverings for windows and, more particularly, to transparent coverings having multiple lenses stacked one over the other and adhered together by adhesive.

2. Related Art

There may be various advantages to affixing transparent lenses to curved substrates such as windshields (also referred to as windscreens). Such coverings may provide protection from pitting and cracking, tinting (e.g. for privacy), thermal insulation, blocking of ultraviolet (UV) radiation, and/or decoration. A stack of such transparent lenses may allow for easy tear-away as the outermost lens becomes dirty and obstructs the driver's vision, such as might occur in vehicles for off-road use.

While the surface of a typical windshield usually exhibits a compound curvature, the transparent lenses may themselves be flat, such as in the case of polyethylene terephthalate (PET) films manufactured in a roll-to-roll process. In order to install a flat film to a compound curved windshield surface, the film may be drape formed over the windshield, e.g. by laying the film over the windshield and applying heat to the uppermost surface to shrink or stretch the film to take the shape of the windshield. However, this process may result in uneven heating or overheating, which may cause optical distortion in the film and may result in areas where the film is not adequately adhered to the windshield. In addition, the efforts of the installer to apply pressure to the film with a card or squeegee may result in permanently scratching the visible surface during installation.

BRIEF SUMMARY

The present disclosure contemplates various systems and methods for overcoming the above drawbacks accompanying the related art. One aspect of the embodiments of the present disclosure is a method of installing a stack of two or more lenses on a curved substrate. The method may include placing a moldable covering on a curved substrate, the moldable covering including a stack of two or more lenses, an adhesive layer interposed between each pair of adjacent lenses from among the two or more lenses, and a sacrificial layer disposed on an outermost lens of the stack, the sacrificial layer including a sacrificial lens and a sacrificial adhesive interposed between the sacrificial lens and the outermost lens of the stack. The method may include applying heat and pressure to the sacrificial layer and peeling off the sacrificial layer to reveal the stack of two or more lenses.

The curved substrate may be a compound curved substrate. The curved substrate may be a windshield.

The sacrificial layer may be more heat resistant than the outermost lens of the stack.

The sacrificial layer may be less scratch resistant than the outermost lens of the stack.

The sacrificial lens may comprise a biaxially oriented polyethylene terephthalate film. The biaxially oriented polyethylene terephthalate film may be able to withstand temperatures between room temperature and 220° C. for two hours.

The sacrificial lens may comprise an opaque polyester film. The outermost lens of the stack may comprise a transparent polyethylene terephthalate film.

Another aspect of the embodiments of the present disclosure is a moldable covering affixable to a curved substrate, the moldable covering may include a stack of two or more lenses, an adhesive layer interposed between each pair of adjacent lenses from among the two or more lenses, and a sacrificial layer disposed on an outermost lens of the stack, the sacrificial layer including a sacrificial lens and a sacrificial adhesive interposed between the sacrificial lens and the outermost lens of the stack, the sacrificial layer being more heat resistant than the outermost lens of the stack.

The sacrificial lens may comprise a biaxially oriented polyethylene terephthalate film. The biaxially oriented polyethylene terephthalate film may be able to withstand temperatures between room temperature and 220° C. for two hours.

The sacrificial lens may comprise an opaque polyester film. The outermost lens of the stack may comprise a transparent polyethylene terephthalate film.

Another aspect of the embodiments of the present disclosure is a moldable covering affixable to a curved substrate. The moldable covering may include a stack of two or more lenses, an adhesive layer interposed between each pair of adjacent lenses from among the two or more lenses, and a sacrificial layer disposed on an outermost lens of the stack, the sacrificial layer including a sacrificial lens and a sacrificial adhesive interposed between the sacrificial lens and the outermost lens of the stack, the sacrificial layer being less scratch resistant than the outermost lens of the stack.

The sacrificial lens may comprise a biaxially oriented polyethylene terephthalate film. The biaxially oriented polyethylene terephthalate film may be able to withstand temperatures between room temperature and 220° C. for two hours.

The sacrificial lens may comprise an opaque polyester film. The outermost lens of the stack may comprise a transparent polyethylene terephthalate film.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a moldable covering including a stack of two or more lenses and an installation method thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figure 1:
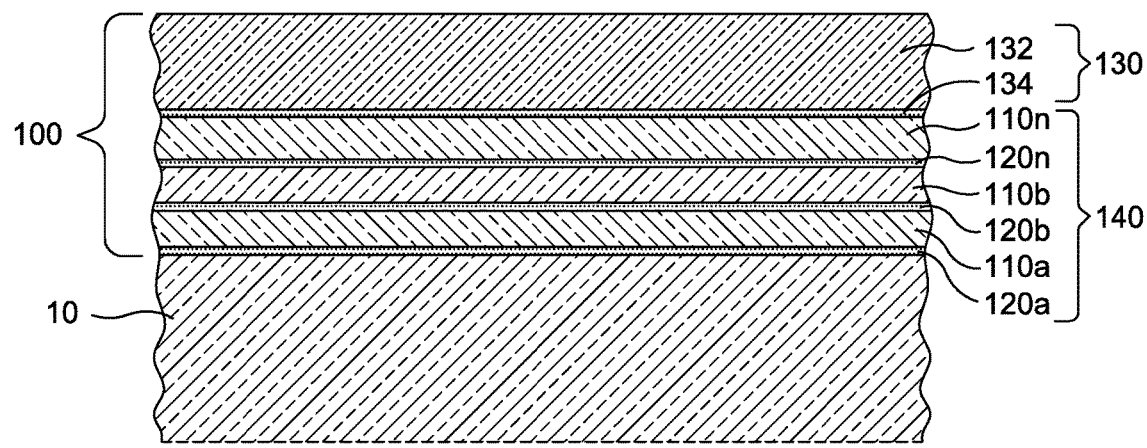
FIG. 1 is schematic side view of a moldable covering according to an embodiment of the present disclosure.

FIG. 1 is schematic side view of a moldable covering 100 according to an embodiment of the present disclosure. The moldable covering 100 may be affixed to a curved substrate 10 such as a windshield as part of the process of installing a stack of lenses 110a, 110b, . . . 110n (collectively lenses 110). The installed stack of lenses 110 may provide the substrate 10 with protection, tinting, thermal insulation, blocking ultraviolet (UV) radiation, decoration, and/or the ability to peel away and discard the outermost layer 110n (and thereafter any newly revealed layers 110) as needed during the lifetime of the product. In addition to the lenses 110, the moldable covering 100 may include adhesive layers 120a, 120b, . . . 120n (collectively adhesive layers 120) provided respectively on each lens 110, such that an adhesive layer 120 is interposed between each pair of adjacent lenses 110 of the stack. On the outermost lens 110n of the stack of lenses 110, a sacrificial layer 130 may be provided to allow for an improved process of installing the stack of lenses 110 to the substrate 10. The sacrificial layer 130 may include a sacrificial lens 132 and a sacrificial adhesive 134 interposed between the sacrificial lens 132 and the outermost lens 110n of the stack of lenses 110. When installing the stack of lenses 110, heat and pressure may be applied to the sacrificial layer 130 to conform the stack of lenses 110 to the shape of the curved substrate 10. Thereafter, the sacrificial layer 130 may be peeled away to reveal the final product 140 including the installed lenses 110.

If one were to only drape form the stack of lenses 110 on the curved substrate 10 without the sacrificial layer 130, the process could result in uneven heating or overheating as explained above, as well as the possibility of permanently scratching the outermost lens 110n with a card or squeegee. The inventor has found that these difficulties stem largely from the lack of a female mold cavity to apply pressure as the stack of lenses 110 conforms to the male surface represented by the curved substrate 10. As a result, neither heat nor pressure is evenly distributed when the installer attempts to mold the stack of lenses 110 to the curved substrate 10, resulting in the stated difficulties. By providing the sacrificial layer 130 to serve as the missing female mold cavity, the disclosed moldable covering 100 may overcome these deficiencies in at least two ways. First, the sacrificial layer 130 may allow the installer to apply heat and pressure without fear of scratching or otherwise damaging the end product. The sacrificial layer 130 may simply be discarded along with any surface damage, while the underlying outermost lens 110n of the stack of lenses 110 remains unblemished. Second, as heat and pressure are applied to the stack of lenses 110 through the intervening sacrificial layer 130, the sacrificial layer 130 may serve to distribute the heat and pressure over a wider area, resulting in a more even application of heat and pressure as the sacrificial layer 130 and underlying stack of lenses 110 together conform to the shape of the curved substrate 10.

The lenses 110 may comprise a transparent polyethylene terephthalate (PET) film such as a biaxially-oriented polyethylene terephthalate (BoPET) and may be fabricated from sheets of polyester film sold under the registered trademark Mylar owned by the DuPont Company. The thickness of each lens 110 may be between 0.5 mil and 7 mil (1 mil is 0.001"), for example, 2 mil. Even after the adhesive material of the adhesive layers 120 is applied to a 2-mil thickness lens 110, the combined thickness of the 2-mil thickness lens 110 and adhesive layer 120 may still be 2 mil due to the adhesive layer 120 having only a nominal thickness.

The adhesive used in the adhesive layers 120 may be applied, for example, in selective areas around the periphery of the moldable covering 100 as described in U.S. Pat. No. 6,536,045 to Wilson, issued Mar. 25, 2003 and entitled "Tear-off Optical Stack Having Peripheral Seal Mount," the entire contents of which is expressly incorporated herein by reference. The adhesive layers 120 may be made of a clear optical low tack material and may comprise a water-based acrylic optically clear adhesive or an oil-based clear adhesive. The adhesive layer 120a used to affix the moldable covering 100 to the substrate 10 may be the same as or different from (e.g. stronger than) that of the adhesive layers 120b, . . . 120n interposed between each pair of adjacent lenses 110 of the stack. A stronger adhesive may be used, for example, in a case where individual lenses 110 are to be torn off without removing the entire stack of lenses 110 from the substrate 10 during use. Along the same lines, the adhesive used for the adhesive layers 120b, . . . 120n interposed between each pair of adjacent lenses 110 may be stronger than the sacrificial adhesive 134 of the sacrificial layer 130, such that the sacrificial layer 130 may be torn off without removing the outermost lens 110n from the stack of lenses 110. The sacrificial adhesive 134 may similarly be a low tack material and may comprise a water-based acrylic optically clear adhesive or an oil-based clear adhesive. However, in the case of the sacrificial adhesive 134, an opaque adhesive may be used instead since the sacrificial adhesive 134 is removed in the final product 140.

The lenses 110 may be optimized for scratch resistance and/or blocking (absorbing or reflecting) UV radiation. For example, an exterior side of each lens 110 may be deposited, sprayed, laminated, or otherwise coated with a coating (e.g. silicon ester acrylate oligomer and/or acrylated urethane polyol) that is optimized for scratch resistance and/or blocking UV radiation as desired for properties suitable to the finished product 140. These properties may be relaxed in the fabrication of the sacrificial layer 130, since the sacrificial layer 130 will not be present after the installation is complete. Thus, for example, the sacrificial layer 130 may be less scratch resistant than the outermost lens 120n of the stack of lenses 120. Meanwhile, the sacrificial layer 130 may be optimized for heat resistance, for example, coated with a coating (e.g. silicon ester acrylate oligomer and/or acrylated urethane polyol) that is optimized for heat resistance, since the sacrificial layer 130 may be heated directly as part of thermoforming the moldable covering 100 to the shape of the curved substrate 10. Such heat resistance properties may be relaxed in the underlying stack of lenses 100 as these lenses may only be subjected to the heat indirectly through the sacrificial layer 130. Thus, for example, the sacrificial layer 130 may be more heat resistant than the outermost lens 110n of the stack of lenses 100.

The sacrificial layer 130 may be made of a high temperature PET, for example, one that is able to withstand temperatures between room temperature and 220° C. for two hours (e.g. without deteriorating). The high temperature PET may be a clear BoPET, allowing for observation of the underlying stack of lenses 110 during the molding process, and may, for example, be a polyester film sold under the tradename Hostaphan RBB by the Mitsubishi Polyester Film Group. Such a high temperature BoPET may be preferred when using hot air to heat the sacrificial layer 130 during the molding process. Alternatively, the sacrificial layer 130 may be made of an opaque (e.g. white) polyester film such as one sold under the tradename Hostaphan WIN by the Mitsubishi Polyester Film Group. Such an opaque polyester film may provide increased thermal uniformity when using infrared heaters to heat the sacrificial layer 130 during the molding process.

While the sacrificial layer 130 (e.g. the sacrificial lens 132 and/or the sacrificial adhesive 134) may be optimized to withstand the heat of the installation process and to evenly distribute heat and pressure to the underlying stack of lenses 110, it is generally unnecessary for the sacrificial layer 130 to meet the more stringent performance standards of the underlying stack of lenses 110. For example, the stack of lenses may be designed to meet federal standards for visible light transmission (e.g. 70%), such as may be set forth in the American National Standards Institute (ANSI) standards Z26.1-1966 and Z26.1a-1969, as well as to resist scratching (e.g. by windshield wipers) as described above and/or to absorb or reflect UV light to protect the lenses 110 from sun damage. By relaxing these requirements in the sacrificial layer 130, while at the same time providing a more robust surface for applying heat and pressure without worry during installation, the moldable covering 100 may allow for a more efficient method of installing the stack of lenses 110. With the sacrificial layer 130 acting as a female mold cavity, the layers of lenses 110 and adhesive 120 are held, form, and cure better to the curved substrate 10 and never get scratched during the installation process.

Figure 2:
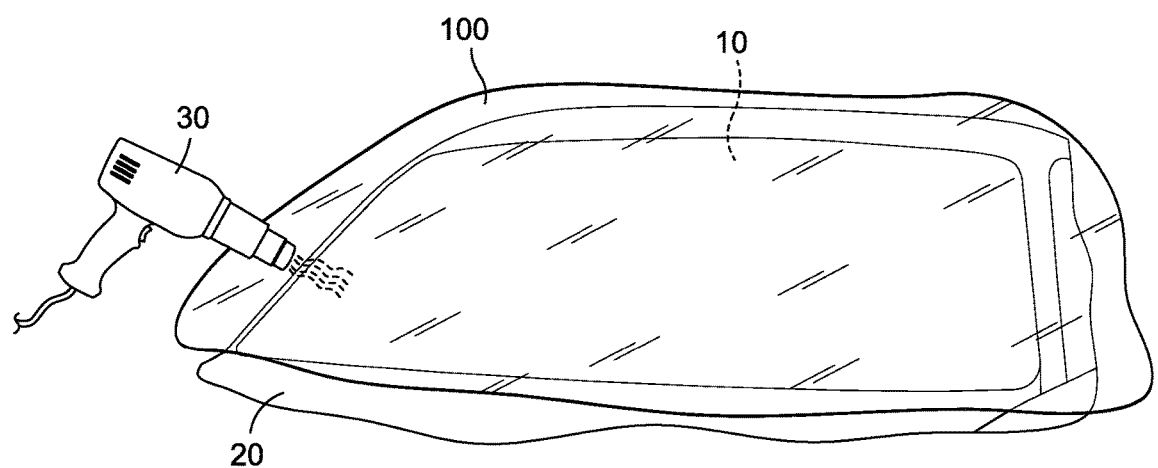
FIG. 2 shows the moldable covering placed on a windshield at the beginning of a process of applying heat and pressure to a sacrificial layer of the moldable covering.

FIG. 2 shows the moldable covering 100 placed on a windshield of a car 20, the windshield serving as the substrate 10, at the beginning of a process of applying heat and pressure to the sacrificial layer 130 of the moldable covering 100. The moldable covering 100 may be adhered to the windshield by a dry mount adhesive 120a (see FIG. 1) as disclosed, for example, in U.S. Pat. No. 9,295,297 to Wilson, issued Mar. 29, 2016 and entitled "Adhesive Mountable Stack of Removable Layers," the entire contents of which is expressly incorporated herein by reference. Alternatively, a wet mount adhesive 120a may be used as disclosed, for example, in U.S. Pat. No. 9,128,545 to Wilson, issued Sep. 8, 2015 and entitled "Touch Screen Shield," the entire contents of which is expressly incorporated herein by reference. Since the moldable covering 100 may be flat (e.g. having been manufactured in a roll-to-roll process), the moldable covering 100 may not initially conform to the curved shape of the windshield, resulting in regions of greater or less adhesion and pockets/bubbles of air between the moldable covering 100 and the windshield. Therefore, in order to conform the moldable covering 100 to the shape of the windshield, heat and pressure may be applied using a heater 30 such as a hot air source (e.g. a heat gun or blow dryer) or an infrared heater. At the same time, pressure may be applied to the moldable covering 100 using a card or squeegee. As the installer heats and presses down on the sacrificial layer 130 of the moldable covering 100, the sacrificial layer 130 may shrink and stretch to take on the contour of the opposing curved substrate 10 (the windshield) with the stack of lenses 110 therebetween. In this way, the sacrificial layer 130 may act as a female mold cavity to thermoform the underlying stack of lenses 110 to the shape of the windshield, evenly distributing the heat and pressure to shrink and stretch the lenses 110 to the correct shape and cure the adhesive layers 120.

Figure 3:
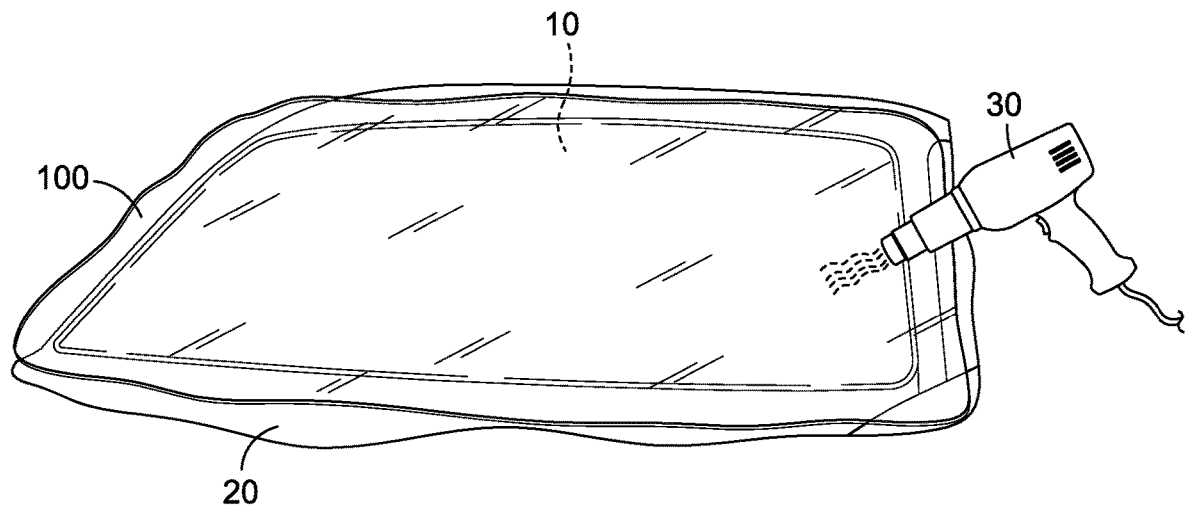
FIG. 3 shows the moldable coveting on the windshield at the end of the process of applying heat and pressure.

FIG. 3 shows the moldable covering 100 on the windshield at the end of the process of applying heat and pressure. At this stage, the moldable covering 100, including the sacrificial layer 130 as well as the underlying lenses 110, is molded to the curved shape of the windshield without air pockets/bubbles. The upper surface of the sacrificial layer 130 may have various scratches and other blemishes caused by the installer as the installer applied pressure to the moldable covering 100 using a squeegee or card. However, the underlying lenses 110 have been protected by the sacrificial layer 130 and are thus untouched.

Figure 4:
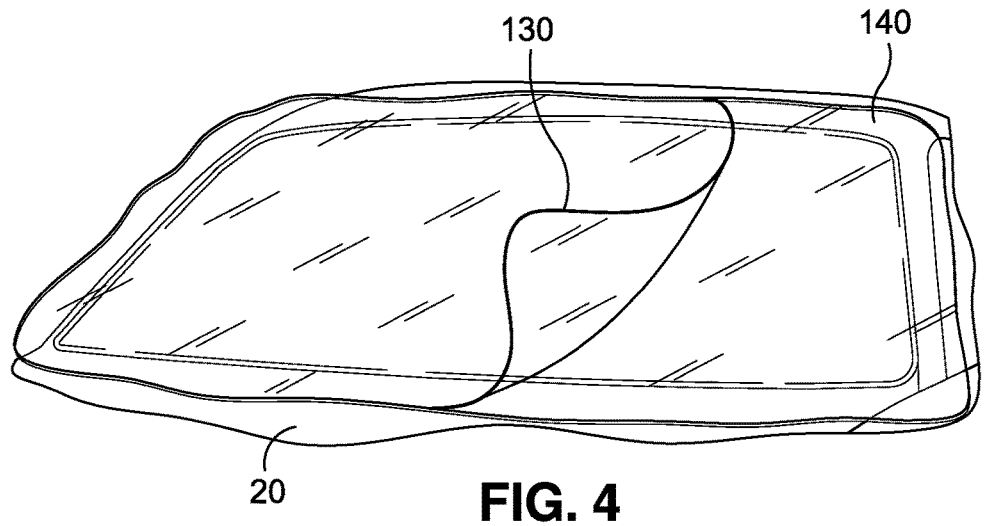
FIG. 4 shows the moldable covering on the windshield as the sacrificial layer is being peeled off to reveal a stack of transparent lenses.

FIG. 4 shows the moldable covering 100 on the windshield as the sacrificial layer 130 is being peeled off to reveal the stack of transparent lenses 110. Remaining on the windshield is the final product 140 (see FIG. 1) including the stack of lenses 110 and adhesive layers 120. The final product 140 may meet performance standards as described above, including federal standards for visible light transmission (e.g. 70%), as well as scratch resistance and/or UV absorption or rejection. The lenses 110 of the final product 140 may be accurately conformed to the shape of the windshield and may be free of blemishes, even on the outermost lens 110n. The peeled off sacrificial layer 130 may simply be discarded.

Figure 5:
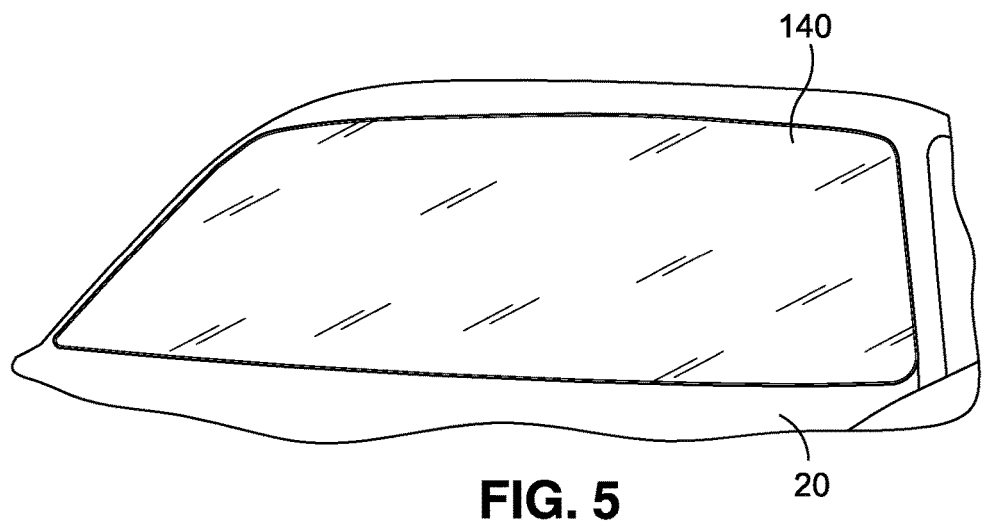
FIG. 5 shows the stack of transparent lenses after they have been trimmed to fit the windshield.

FIG. 5 shows the final product 140 including the stack of transparent lenses 110 after the stack of transparent lenses 110 has been trimmed to fit the windshield serving as the substrate 10. The stack of transparent lenses 110 may be trimmed using a knife such as a utility knife or box cutter with a stainless-steel blade (a carbon blade may damage the windshield). The trimming may be done after the sacrificial layer 130 has been removed from the moldable covering 100 as shown in FIG. 5, such that only the revealed final product 140 is trimmed. Alternatively, the trimming may be done prior to the removal of the sacrificial layer 130, once the moldable covering 100 has been conformed to the shape of the windshield as shown in FIG. 3. In either case, the resulting trimmed final product 140 may effectively be invisible as it matches the shape of the windshield beneath (though it may alter the coloring of the windshield as in the case of window tinting).

Figure 6:
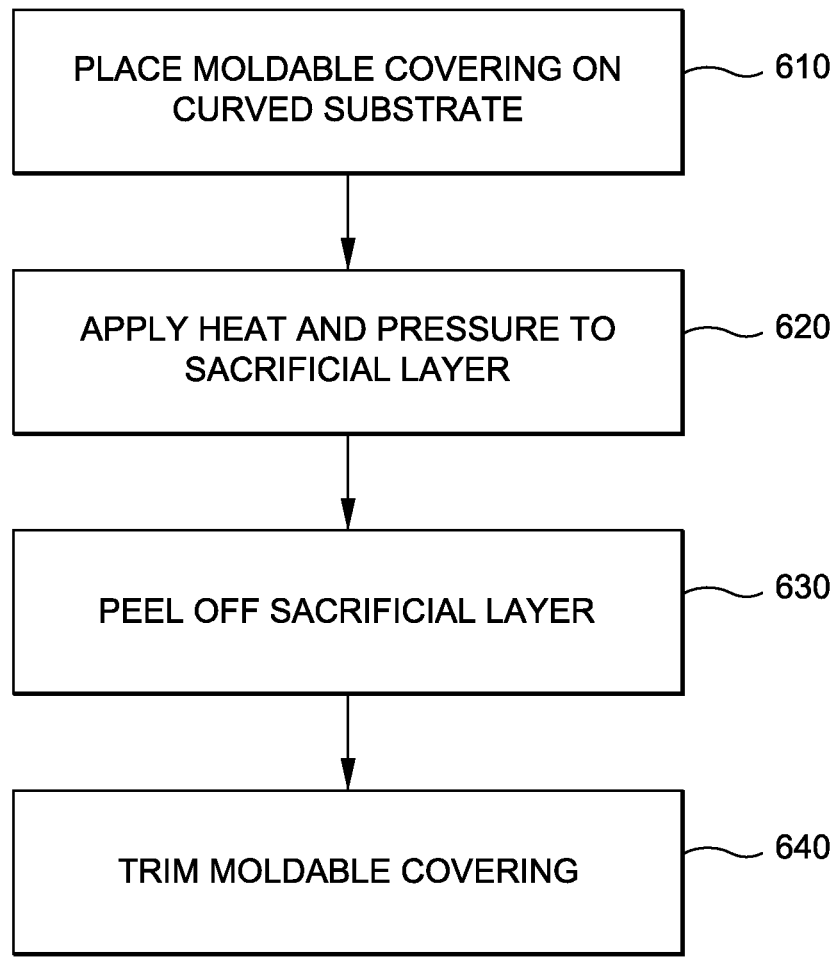
FIG. 6 shows an example operational flow according to an embodiment of the present disclosure.

FIG. 6 shows an example operational flow according to an embodiment of the present disclosure. The operational flow of FIG. 6 may serve as an example method of installing the final product 140 including the stack of lenses 110 shown in FIG. 1. First, the moldable covering 100, including both the final product 140 and the sacrificial layer 130, may be placed on a curved substrate 10 such as the windshield of the car 20 shown in FIG. 2 (step 610), with the adhesive layer 120a on the windshield and the sacrificial layer 130 facing outward away from the windshield. For easier installation, the moldable covering 100 may be rough cut (e.g. using an electric film cutter) so as not to extend too far outside the windshield. The operational flow may continue with applying heat and pressure to the sacrificial layer 130 of the moldable covering 100 as described in relation to FIGS. 2 and 3 in order to thermoform the moldable covering 100 to the curved shape of the windshield (step 620). After allowing the moldable covering 100 to cool down, the operational flow may conclude with peeling off the sacrificial layer 130 to reveal the final product 140 as described in relation to FIG. 4 (step 630) and performing a final trim as described in relation to FIG. 5 (step 640). As noted above, steps 630 and 640 may be performed in the order shown in FIG. 6 or in reverse order. The final product 140 including the stack of lenses 110 is now uniformly formed and affixed to the windshield surface.

In the example of FIG. 1, three lenses 110 are shown. However, it is contemplated for the moldable covering 100 to include a stack of four or more lenses 110, or a stack of two lenses 110 or even a single lens 110, with the number of lenses 110 depending on the particular application. Counterintuitively, the inventor has found that a stack of multiple lenses 110 is easier to thermoform to a curved substrate 10 than a stack having a single lens 110.

Throughout this disclosure, the word "transparent" is used broadly to encompass any materials that can be seen through. The word "transparent" is not intended to exclude translucent, hazy, frosted, colored, or tinted materials.

The coatings described throughout this disclosure may be applied according to known methods such as spin coating, dip coating, or vacuum deposition.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed:

1. A moldable covering affixable to a curved substrate, the moldable covering comprising:
    a stack of two or more lenses;
    an adhesive layer interposed between each pair of adjacent lenses from among the two or more lenses;
    a sacrificial layer disposed on an outermost lens of the stack, the sacrificial layer including a sacrificial lens and a sacrificial adhesive interposed between the sacrificial lens and the outermost lens of the stack, the sacrificial layer being more heat resistant than the outermost lens of the stack such that the sacrificial layer is able to withstand, without deteriorating, directly applied heat that would result in deterioration of the outermost lens of the stack if directly applied thereto.

2. The moldable covering of claim 1, wherein the sacrificial lens comprises a biaxially oriented polyethylene terephthalate film.

3. The moldable covering of claim 2, wherein the biaxially oriented polyethylene terephthalate film can withstand temperatures between room temperature and 220° C. for two hours.

4. The moldable covering of claim 1, wherein the sacrificial lens comprises an opaque polyester film.

5. The moldable covering of claim 4, wherein the outermost lens of the stack comprises a transparent polyethylene terephthalate film.

6. A moldable covering affixable to a curved substrate, the moldable covering comprising:
    a stack of two or more lenses;
    an adhesive layer interposed between each pair of adjacent lenses from among the two or more lenses;
    a sacrificial layer disposed on an outermost lens of the stack, the sacrificial layer including a sacrificial lens and a sacrificial adhesive interposed between the sacrificial lens and the outermost lens of the stack, the sacrificial layer being less scratch resistant than the outermost lens of the stack such that the sacrificial layer is scratched by directly applied pressure that would not result in scratching of the outermost lens of the stack if directly applied thereto.

7. The moldable covering of claim 6, wherein the sacrificial lens comprises a biaxially oriented polyethylene terephthalate film.

8. The moldable covering of claim 7, wherein the biaxially oriented polyethylene terephthalate film can withstand temperatures between room temperature and 220° C. for two hours.

9. The moldable covering of claim 6, wherein the sacrificial lens comprises an opaque polyester film.

10. The moldable covering of claim 9, wherein the outermost lens of the stack comprises a transparent polyethylene terephthalate film.

* * * * *